(12) United States Patent
Duval

(10) Patent No.: US 12,386,629 B2
(45) Date of Patent: *Aug. 12, 2025

(54) CONCURRENT IMAGE MEASUREMENT AND EXECUTION

(71) Applicant: Lodestar Licensing Group, LLC, Evanston, IL (US)

(72) Inventor: Olivier Duval, Pacifica, CA (US)

(*) Notice: Subject to any disclaimer, the term of this patent is extended or adjusted under 35 U.S.C. 154(b) by 67 days.

This patent is subject to a terminal disclaimer.

(21) Appl. No.: 18/232,714

(22) Filed: Aug. 10, 2023

(65) Prior Publication Data

US 2024/0111545 A1 Apr. 4, 2024

Related U.S. Application Data

(60) Continuation of application No. 17/366,916, filed on Jul. 2, 2021, now Pat. No. 11,726,795, which is a division of application No. 16/118,492, filed on Aug. 31, 2018, now Pat. No. 11,055,105.

(51) Int. Cl.
*G06F 9/4401* (2018.01)

(52) U.S. Cl.
CPC .................. *G06F 9/4406* (2013.01)

(58) Field of Classification Search
CPC ................................................ G06F 9/4406
See application file for complete search history.

(56) References Cited

U.S. PATENT DOCUMENTS

| | | |
|---|---|---|
| 5,765,037 A | 6/1998 | Morrison et al. |
| 6,035,374 A | 3/2000 | Panwar et al. |
| 7,007,161 B2 * | 2/2006 | Bradley ............... G06F 9/4405 713/1 |
| 7,210,127 B1 | 4/2007 | Rangachari |
| 7,624,260 B2 | 11/2009 | Ethier et al. |
| 8,358,653 B1 | 1/2013 | Attig |

(Continued)

FOREIGN PATENT DOCUMENTS

| | | |
|---|---|---|
| KR | 10-2007-0108060 A | 11/2007 |
| WO | 2012138957 A1 | 10/2012 |

OTHER PUBLICATIONS

Implementing a ARM-based secure Boot Scheme for the isolated Execution Environment, Hang Jiang, Rui Chang, Lu Ren, Weiyu Dong (Year: 2017).*

(Continued)

*Primary Examiner* — Aurel Prifti
(74) *Attorney, Agent, or Firm* — Brooks, Cameron & Huebsch, PLLC

(57) ABSTRACT

Apparatuses and methods related to concurrently measuring and executing images. An apparatus for concurrently measuring and executing images can include a memory device, a first processing resource and a second processing resource. The first processing resource can execute instructions stored in the memory device to execute a first portion of an image responsive to measuring the first portion of the image and execute a second portion of the image responsive to measuring the second portion of the image. The second processing resource can execute instructions stored in the memory device to measure the first portion of the image and measure the second portion of the image concurrently with an execution of the first portion of the image by the first processing resource.

20 Claims, 4 Drawing Sheets

(56) References Cited

U.S. PATENT DOCUMENTS

| | | | |
|---|---|---|---|
| 9,165,143 B1* | 10/2015 | Sanders | G06F 21/575 |
| 9,361,244 B2 | 6/2016 | Hiremane | |
| 9,658,858 B2* | 5/2017 | Koszek | G06F 9/4405 |
| 10,057,243 B1 | 8/2018 | Kumar | |
| 10,565,382 B1 | 2/2020 | Diamant | |
| 11,734,018 B2* | 8/2023 | Benisty | G06F 3/0673 |
| | | | 713/2 |
| 2006/0095726 A1 | 5/2006 | Zaabab | |
| 2008/0165952 A1 | 7/2008 | Smith et al. | |
| 2009/0110190 A1 | 4/2009 | Dolgunov | |
| 2009/0327678 A1 | 12/2009 | Dutton | |
| 2009/0327680 A1 | 12/2009 | Dale et al. | |
| 2011/0246759 A1 | 10/2011 | Lai | |
| 2011/0271126 A1 | 11/2011 | Hill | |
| 2012/0042376 A1 | 2/2012 | Dolgunov | |
| 2012/0084547 A1* | 4/2012 | Jung | G06F 15/177 |
| | | | 713/2 |
| 2012/0284772 A1 | 11/2012 | Kwon | |
| 2014/0013089 A1 | 1/2014 | Henry et al. | |
| 2014/0089651 A1 | 3/2014 | Yao | |
| 2015/0019793 A1 | 1/2015 | Dover | |
| 2015/0039876 A1* | 2/2015 | Baratam | G06F 9/4401 |
| | | | 713/2 |
| 2015/0106609 A1* | 4/2015 | Koszek | G06F 9/4405 |
| | | | 713/1 |
| 2015/0113258 A1* | 4/2015 | Grieco | G06F 21/572 |
| | | | 713/2 |
| 2015/0199520 A1 | 7/2015 | Woolley | |
| 2016/0274918 A1 | 9/2016 | Moon | |
| 2016/0283250 A1* | 9/2016 | Fujiwara | G06F 11/2284 |
| 2017/0372074 A1* | 12/2017 | Gunti | G06F 21/575 |
| 2019/0005244 A1* | 1/2019 | Brasher | G06F 12/145 |
| 2019/0058588 A1* | 2/2019 | Chen | H04L 9/0863 |
| 2019/0078746 A1 | 3/2019 | Dubosc | |
| 2019/0087578 A1 | 3/2019 | Govindarajan | |
| 2019/0102539 A1 | 4/2019 | Durham | |
| 2019/0266331 A1 | 8/2019 | Sanchez Diaz | |
| 2019/0324806 A1* | 10/2019 | Javre | G06F 9/4406 |
| 2020/0134186 A1 | 4/2020 | Hong | |

OTHER PUBLICATIONS

International Search Report & Written Opinion from related International Application No. PCT/US2019/048945, dated Dec. 12, 2019, 12 pages.

* cited by examiner

CONCURRENT IMAGE MEASUREMENT AND EXECUTION

PRIORITY INFORMATION

This application is a Continuation of U.S. application Ser. No. 17/366,916, filed on Jul. 2, 2021, which is a Divisional of U.S. application Ser. No. 16/118,492, filed on Aug. 31, 2018, now issued as U.S. Pat. No. 11,055,105 on Jul. 6, 2021, the contents of which are incorporated herein by reference.

TECHNICAL FIELD

The present disclosure relates generally to memory, and more particularly, to apparatuses and methods associated with measuring and executing an image currently.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), ferroelectric RAM (FeRAM), and resistance variable memory such as phase change random access memory (PCRAM), three dimensional (3D) cross-point (e.g., 3D XPoint), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instruction (e.g., a program, applications, etc.). A computing system can generate an image corresponding to an application. The computing system can also execute applications that are part of an image. The application can be, for example, an operating system (OS). The operating system execution can begin at boot time. The application can be provided as source code. The source code can be compiled to generate executable files. The image can be created in part from one or more executable files.

DETAILED DESCRIPTION

Figure 1:
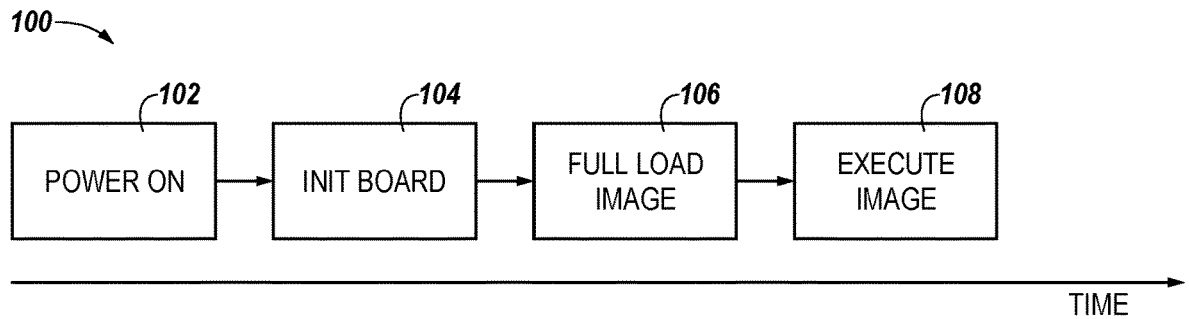
FIG. 1 is flow chart illustrating a method for loading and executing an image in accordance with the prior art.

The present disclosure includes apparatuses and methods related to the concurrent measurement and execution of an image. An example apparatus can include a memory device and a first processing resource to execute a first portion of an image responsive to measuring the first portion of the image and execute a second portion of the image responsive to measuring the second portion of the image. The example apparatus can also include a second processing resource to measure the first portion of the image and measure the second portion of the image concurrently with an execution of the first portion of the image by the first processing resource.

Secure booting can include associating an image stored in memory with a signature that can be verified with a cryptographic key. The signature can be assessed to determine whether the image has been produced by a trusted agent. As used herein, a trusted agent is an entity authorized to generate and/or store images in the memory. The trusted agent can include an authorized user of the computing system and/or authorized computer readable instructions configured to generate an image and/or store the image in memory.

The process of utilizing the cryptographic key and the signature to determine whether the image has been produced by a trusted agent can be referred to as measuring. The image can be measured to determine whether the image has been produced by a trusted agent.

Measuring an image may delay boot time. The delay may exceed a tolerance threshold in time-critical applications. A time-critical application can include, for example, an application operating in an automobile. An automobile application can be time-critical because a duration of time used to measure an image can have an impact on the state of the automobile and/or the application operating in the automobile. For example, a delay in measuring an image can have negative impact on the automobile. An image may be authenticated by authenticating a portion of the image and running the authenticated portions sequentially. Portions of the image may be authenticated and executed sequentially to verifying that the portions of the image have been produced by a trusted agent. For example, the image may be copied from memory to cache corresponding to the processing resource. The processing resource may retrieve the image from cache and execute different portions of the image sequentially.

In a number of examples, the image can be measured and executed directly from memory. For example, the image can be measured and executed directly from non-volatile memory such as flash memory, among other types of non-volatile memory. Measuring and/or executing an image from memory can be referred to as execution-in-place. Said differently, a processing resource can execute an image from memory. Executing the image directly from memory may include refraining from copying the image before the image is executed. For example, executing the image directly can include refraining from copying the image to volatile memory before the image is executed from non-volatile memory.

Images executed-in-place can also be authenticated to perform a secure execution of the image. The image can be divided into portions. The portions of the image can be measured and executed at different times without compromising the security.

For example, the image can be measured while the image is being executed. Portions of the image can be measured while different portions of the image are being executed. Concurrently measuring and executing the image can reduce a delay to running an application. For example, concurrently measuring and executing the image can reduce the delay to a boot time.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is flow chart illustrating prior art of a method 100 for loading and executing an image. At 102, the method 100 includes powering (e.g., turning on) a computing device. At 104, the method includes initiating a board. A board refers to a circuit board. The circuit board is a component of the computing device. The board can facilitate communication between devices of the computing system. The board can also provide power to the devices comprising the computing system. The board can facilitate communications provide powers through electrical connections by which the devices of the computing system are coupled. Initiating a circuit board can include providing power to non-volatile memory (e.g., flash memory) integrated in the circuit board and providing power to the electrical connections/components of the circuitry board. Initiating the circuitry board can also include initiating a basic input/output system stored in the non-volatile memory. Initiating the circuit board can further include conducting a number of tests to ensure system health. Initializing the circuit board can include loading an operating system using machine-readable instructions stored in the non-volatile memory.

At 106, the method 100 includes loading a full image. At 108, the method includes executing the image.

Powering a device may include providing power to a computing device. Upon providing power to the computing device, a board can be initiated. In the example of FIG. 1, loading an image includes loading a full image. The image can be loaded from a non-volatile memory device (e.g., flash or hard disk, among others) to volatile memory (e.g., DRAM and/or SRAM, among others). Loading can include storing or copying the image. Loading a full image includes loading an entire image without making alterations and/or changes to the image. The image is loaded before the image is executed. For example, the full image is loaded before the full image is executed.

Loading an image and executing an image can be part of executing an operating system (OS) which can be done upon executing a power on event. FIG. 1 shows a boot sequence with no delay due to the unsecure nature of the boot sequence. The boot sequence is unsecure because the image is not measured.

To secure an image, a signature of the image can be created; the image and its signature are then stored in a memory device. The image can also be measured before the image is executed. The integrity of the image can be verified before the image is executed. Verifying that the content of an image has not been modified since its signature was generated can be referred to as measuring the image. The signature can be created using a cryptographic key. A signature generated with a cryptographic key can be referred to as a cryptographic measurement. As such, there are not delays introduced due to cryptographic measurements in FIG. 1 because no cryptographic measurements are performed in FIG. 1.

Cryptographic measurements can introduce delays to the execution of an image. For example, measuring the image before the image is run at 108 can introduce a delay corresponding to the duration of time used to measure the image.

Figure 2:
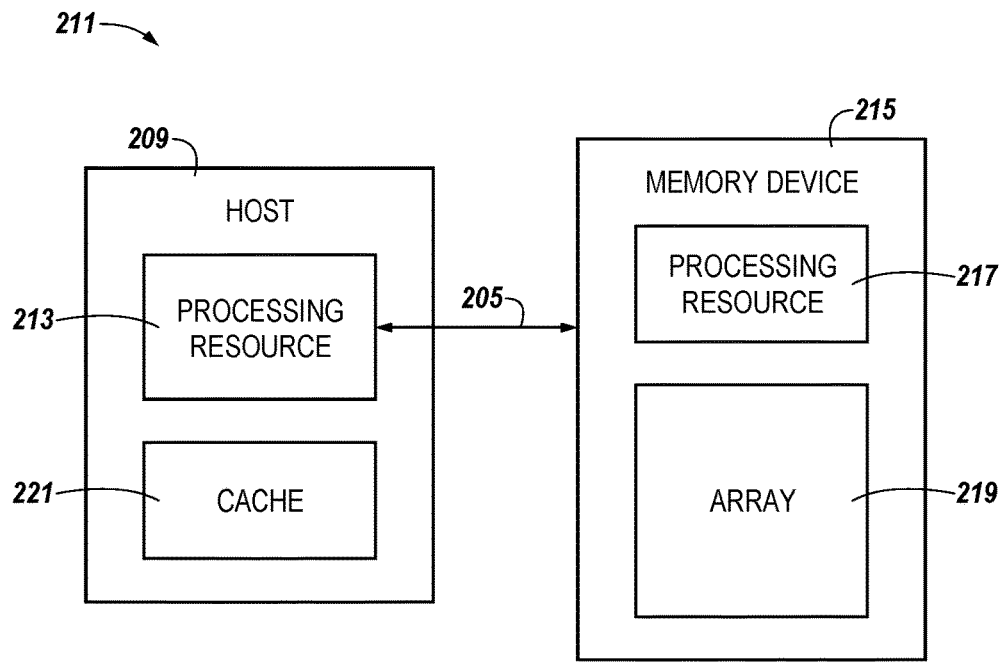
FIG. 2 is a block diagram of an apparatus in the form of a computing system including a processing resource and a memory device capable of concurrently measuring and executing an image accordance with a number of embodiments of the present disclosure.

FIG. 2 is a block diagram of an apparatus in the form of a computing system 211 including a processing resource 213, a memory device 215 and a separate processing resource 217 capable of concurrently measuring and executing an image in accordance with a number of embodiments of the present disclosure. The computing system 211 comprises a host 209, a memory device 215 and a processing resource. The host includes the processing resource 213. The memory device 215 includes a processing resource 217 and an array 219. In some examples, the processing resource 217 can be a standalone processing resource. For example, the processing resource 217 can be external to the memory device 215.

As used herein, an "apparatus" can refer to, but is not limited to, a variety of structures or combinations of structures, such as a circuit or circuitry, a die or dice, a module or modules, a device or devices, or a system or systems. For example, the host 209 and/or the memory device 215 may separately be referred to as an "apparatus."

The memory device 215 can comprise multiple channels each having a number of devices corresponding thereto. The devices can collectively be referred to as memory devices 215. Each of the devices 215 can be, for example, a "chip"

comprising multiple banks. A controller can service multiple memory channels or the controller can be implemented as multiple separate controllers (e.g., one for each channel). The memory device 215 can be a non-volatile memory device or a volatile memory device. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), ferroelectric RAM (FeRAM), and resistance variable memory such as phase change random access memory (PCRAM), three dimensional (3D) cross-point (e.g., 3D XPoint), resistive random access memory (RRAM), and magnetoresistive random access memory (MRAM), among others. In examples that load the image, the image can be loaded from non-volatile memory to volatile memory. In examples that do not load the image, the image can be executed directly from non-volatile memory.

In this example, the computing system includes the host 211 coupled to a controller (e.g., via an interface), which is coupled to the memory device 215 (e.g., via an interface 205). The computing system 211 can be a laptop computer, personal computers, digital camera, digital recording and playback device, mobile telephone, PDA, memory card reader, interface hub, sensor, Internet-of-Things (IoT) enabled device, among other systems, and the host 209 can include a processing resource 213 (e.g., one or more processors) capable of accessing the memory device 215 (e.g., via a controller). The host 209 may be responsible for execution of an OS and/or various applications that can be loaded thereto (e.g., from memory device 215 via a controller).

The memory device 215 through the controller may receive memory access requests (e.g., in the form of read and write commands, which may be referred to as load and store commands, respectively) from the host 209. The controller can transfer commands and/or data between the host 209 and the memory device 215 over the interface 205, which can comprise physical interfaces such as buses, for example, employing a suitable protocol. Such protocol may be custom or proprietary, or the interface 205 may employ a standardized protocol, such as Peripheral Component Interconnect Express (PCIe), Gen-Z, CCIX, or the like.

As an example, the interface 205 may comprise combined address, command, and data buses or separate buses for respective address, command, and data signals. The controller can comprise control circuitry, in the form of hardware, firmware, or software, or any combination of the three. As an example, the controller can comprise a state machine, a sequencer, and/or some other type of control circuitry, which may be implemented in the form of an application specific integrated circuit (ASIC) coupled to a printed circuit board. In a number of embodiments, the controller may be co-located with the host 209 (e.g., in a system-on-chip (SOC) configuration). Also, the controller may be co-located with the memory device 215.

The memory device 215 may be referred to as a memory system. The memory device 215 can include a number of memory devices which may be referred to collectively as a memory device 215. The memory device 215 can include a memory array 219 of memory cells. For example, the memory device 215 can comprise a number of physical memory "chips," or dice which can each include a number of arrays (e.g., banks) of memory cells and corresponding support circuitry (e.g., address circuitry, I/O circuitry, control circuitry, read/write circuitry, etc.) associated with accessing the array(s) 219 (e.g., to read data from the arrays and write data to the arrays). As an example, the memory device 215 can include a number of DRAM devices, SRAM devices, PCRAM devices, RRAM devices, FeRAM, phase-change memory, 3DXPoint, and/or Flash memory devices. In a number of embodiments, the memory device 215 can serve as main memory for the computing system.

In some examples, the processing resource 213 can comprise a central processing unit (CPU). The CPU is an electronic circuitry within the host 209 that executes instructions of an application by performing arithmetic, logical, control and/or input/output (I/O) operations specific to the application. An application can include executable computer readable instructions in the form of an image.

The processing resource 217 can be, for example, a cryptoprocessor. In some examples, the cryptoprocessor can reside external to the memory device 215. A cryptoprocessor can be a processing resource that performs cryptographic operations. In some examples, the cryptoprocessor can be a dedicated processing resource that performs cryptographic operations. In a number of examples, the processing resource 217 can be a processing resource other than a cryptoprocessor such as a graphical processing unit (GPU) among other types of processing resources.

Cryptographic operations can be performed to measure data in order to secure the data. The cryptographic operations can include signature and signature verification operations. Signature operations can sign data utilizing an algorithm and a cryptographic key. Signature verification operations can verify data utilizing the a similar and a cryptographic key. The cryptographic keys used to sign data and verify data can be different keys. For example, data can be signed using a private key while data can be verified using a public key. Data can be signed using an algorithm such as elliptic curve digital signature, involving a cryptographic hash function of the data and an elliptic function of the hash and the private key. The data and its signature are combined and stored. The same data can then be measured by verifying its signature using similar steps, but now with the public key. If the signature verification succeeds, then the image can be trusted. A trusted image is an image produced by a trusted agent, holding a cryptographic key.

In some instances, the cryptographic key can be a symmetric key. The symmetric key can be used for encryption and decryption. The symmetric encryption key and the symmetric decryption key can be a same key or can utilize a transformation to generate one key from the other key.

In some instances, the processing resource(s) can measure an image and execute (e.g., run) an image concurrently. For example, the processing resource 213 can execute an image while the processing resource 217 measures the image. The processing resource 213 can execute a first portion of the image while the processing resource 217 measures a second portion of the image.

In some examples, the processing resource 213 can execute an image that is stored in the memory device 215 (e.g., array 219). For example, the processing resource 213 can execute an image without storing (e.g., copying) the image to volatile memory. The image can be copied to the cache 221 which includes a hardware and/or software device that stores data local to the processing resource 213. In some examples, the image and/or portions of the image can also be copied to program registers of the processing resource 213. The data stored in the cache 221 can be a duplicate (e.g., copy) of data stored in the array 219.

In some examples, the image can be loaded (e.g., copied) from the memory device 215 to volatile memory before the image is copied from volatile memory to the cache 221/ program registers of the processing resource 213. The processing resource 213 can execute an image stored in the array 219 without storing the data corresponding to the image in non-volatile memory other than the cache 221 and/or the program registers.

Figure 3:
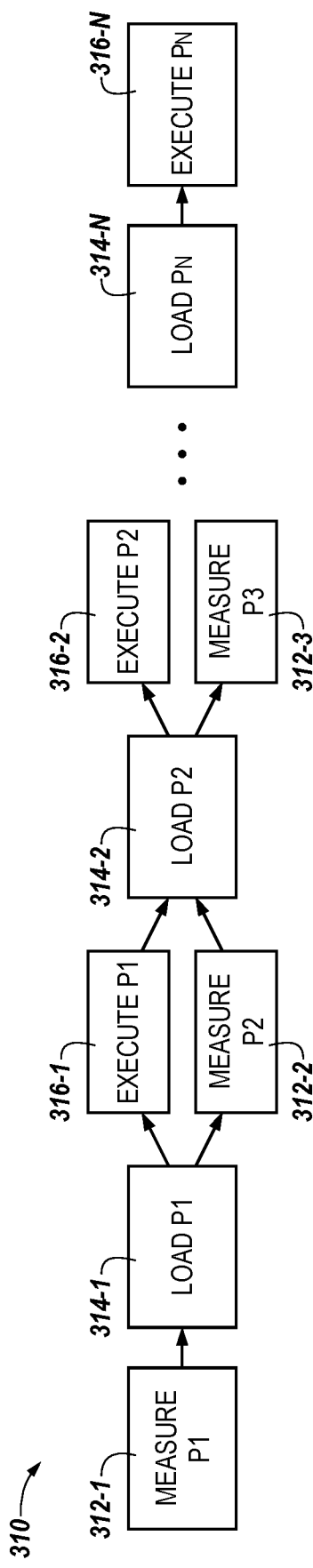
FIG. 3 illustrates a flow chart associated with a method for concurrently measuring and executing an image according with a number of embodiments of the present disclosure.

FIG. 3 illustrates a flow chart 310 associated with a method for concurrently measuring and executing an image according with a number of embodiments of the present disclosure. In some examples, a first processing resource that can be part of a memory device can receive instructions from a second processing resource which is part of a host. The instructions can request the authentication and the delivery of data comprising an image. For example, the request can include a request for a portion of the data comprising the image. In some examples, the request can include a memory address that corresponds to the portion of the data comprising the image. The request can also include a range of addresses comprising a base memory address and a range of memory space which defines a range of addresses corresponding to the portion of the data comprising the image.

At 312-1, a first processing resource (e.g., processing resource 217 in FIG. 2) can measure the first portion of an image. The first processing resource can retrieve the image from a memory array local to the first processing resource. For example, the first processing resource, which is included in the memory device 215 can retrieve the first portion of data comprising a first portion of an image from a memory array which is also included in the memory device.

The first processing resource can measure the first portion of the data comprising the image. The measurement can verify that the image is authentic based on an authentication scheme implemented by the first processing resource. The first processing resource can respond to the second processing resource with the result of the measurement.

The second processing resource can determine whether to load the first portion of the image. If the image is not authenticated, as measured by the first processing resource, then the second processing resource can refrain from proceeding. At 314-1, the second processing resource can load the first portion of the image based on a determination that the first portion of the image was authenticated by the first processing resource. The first portion of the image can be copied from non-volatile memory to volatile memory. The first portion of the image can further be copied from volatile memory to cache. For example, the first portion of the image can be loaded to level 1 cache, level 2 cache, and/or level 3 cache, among other types of cache.

In examples where the image is not loaded, the first portion of the image can be retrieved from the non-volatile memory device and can be provided directly to the second processing resource without storing the first portion of the image in volatile memory. Accordingly, in examples where the image is not copied to volatile memory, the loading (314-1, 314-2, . . . , and 314-N) can be substituted with retrieving the portion of the image from the memory device.

At 316-1 and 312-2, the first portion of the image can be executed concurrently with the measuring of a second portion of the image. The concurrent measurement and execution of the first portion of the image can constitute a bifurcation of an execution stream. For example, a first branch of the execution stream can be controlled by the first processing resource while a second branch of the execution stream is controlled by the second processing resource. As used herein, an execution stream is an execution of an ordered set of instructions as referenced by time. As such, the bifurcation of the execution stream can constitute the execution of different sets of instructions or the refraining from executing instructions at a given time. For example, the second processing resource can execute a first portion of the image while the first processing resource measures a second portion of the image during a same time period.

The first portion of the image can be executed by the second processing resource at 316-1. The second portion of the image can be measured at 312-2. The first portion of the image can be executed concurrently with the measuring of the second portion of the image because the second processing resource executes the first portion of the image while the first processing resource measures the second portion of the image.

In some examples, the second processing resource can direct the measurement of the second portion of the image and the concurrent execution of the first portion of the image. For example, the second processing resource can execute the first portion of the image and wait for the measurement of the second portion of the image to conclude. Responsive to concluding the measurement of the second portion of the image, the first processing resource can notify the second processing resource of the conclusion of the measurement of the second portion of the image.

The first processing resource can provide a notice to the second processing resource utilizing a register. In some examples, the register utilized to provide the notice can be hosted by the memory device hosting the first processing resource and/or the host hosting the second processing resource. The register can be referred to as a status register. The status register can indicate that the second portion of the image is ready to be accessed and/or that the second portion of the image has been successfully measured. Successfully measuring a portion of an image can include a successful termination of the measurement regardless of whether the measurement concluded that the second portion was authentic or not.

In some examples, the status register can include a plurality of status registers. The plurality of status register can describe whether the measurement terminated, whether the measurement determined an authentic portion of the image, and/or whether the measurement determined that the portion of the image was not authentic.

The second processing resource, upon terminating the execution of the first portion of the image, can access the status register. Responsive to determining whether the measurement of the second portion of the image has concluded, the second processing resource can wait for the conclusion of the second portion of the image or can load the second portion of the image at 314-2.

To wait for the conclusion of the measurement of the second portion of the image, the second processing resource can execute a loop. A loop is a control flow statement that repeatedly provides access to instructions. The repeated access to instructions is described as an iteration. As such, each iteration of a loop provides access to a same set of instructions. In some examples, the loop may provide access to no instructions and can be utilized to retain control of the instruction flow of the second processing resource to wait for the conclusion of the measurement of the second portion of the image.

Before each iteration of the loop, the second processing resource can determine whether the measurement of the second portion of the image has terminated. The determination of the termination of the measurement of the second portion of the image can be done utilizing the status register(s). The loop can be any type of loop including a while loop and a for loop, among other types of loops. The determination can be performed before the initiation of an iteration of a loop, during the iteration of a loop, or after each iteration of a loop.

In other examples, the second processing resource can direct the measurement of the second portion of the image and the concurrent execution of the first portion of the image using timing constraints. The first portion of the image can include time restrictions and/or time guidelines that can be used by the second processing resource to determine the execution of the first portion of the image, the measurement of the second portion of the image, the loading of the second portion of the image, and/or the execution of the second portion of the image.

For example, the first portion of the image can include a first duration of time that corresponds to the execution of the first portion of the image. The first duration of time describes a duration of time utilized to execute the first portion of the image by the second processing resource. The first portion of the image can also include a second duration of time that corresponds to the measurement of the second portion of the image. The second portion of the image describes a duration of time utilized to measure the second portion of the image by the first processing resource. The second processing resource can compare the first duration of time and the second duration of time to determine a longest duration of time. The second processing resource can refrain from loading and/or executing the second portion of the image until the longest duration of time has expired.

The longest duration of time can be tracked from a time during the execution of the first portion of the image or from the beginning of the execution of the first portion of the image. For example, the longest duration of time can be measured from a time after the first duration of time and the second duration of time are compared. The longest duration of time can also be measured from a time marking the beginning of the execution of the first portion of the image. If the longest duration of time is the second duration of time, then the longest duration of time can be tracked from a time marking the beginning of the measurement of the first portion of the image.

In some examples, the longest duration of time is not calculated by the second processing resource but can be included in the first portion of the image. In such examples, the second processing resource can extract the longest duration of time during the execution of the first portion of the image and can begin tracking the expiration of the longest duration of time during the execution of the first portion of the image.

The duration of time included in the first portion of the image can be included, for example, in a header of the first portion of the image and/or in the body of the first portion of the image. In some examples, each portion of the image can include a header comprising at least a duration of time. In other examples, not every portion of the image includes a duration of time. For example, a last portion of the image may not include a duration of time due the lack of a need for synchronicity. The last ($P_N$) portion of the image may be executed without concurrently measuring a different portion of the image.

At 312-2, the second processing resource can instruct the first processing resource to measure a second portion of the image. The second processing resource can provide an address, a range of addresses, and/or an identifier of the second portion of the image. The first processing resource can identify and measure the second portion of the image using the address, the range of addresses, and/or the identifier provided by the first processing resource. The first processing resource can provide an indication of the result of the measurement to the second processing resource.

Upon determining that the measurement of the second portion of the image has concluded and that the second portion of the image is authenticated, the second processing resource can load the second portion of the image similarly to the loading of the first portion of the image at 314-1. At 316-2 and 312-3, the second processing resource can execute the second portion of the image and the first processing resource can concurrently measure a third portion of image as described at 316-1 and 312-2. The loading and/or execution of the second portion of the image can constitute a merger of the execution stream of the first processing resource with the second processing resource.

The second processing resource can execute and the first processing resource can concurrently measure a plurality of portion of the image. The second processing resource can execute a $P_{N-1}$ portion of the image and direct the concurrent measurement of the $P_N$ of the image by the first processing resource. Upon the successful measurement of the $P_N$ portion of the image, the second processing resource can load the $P_N$ portion of the image at 314-N and execute the $P_N$ of the image at 316-N.

Figure 4:
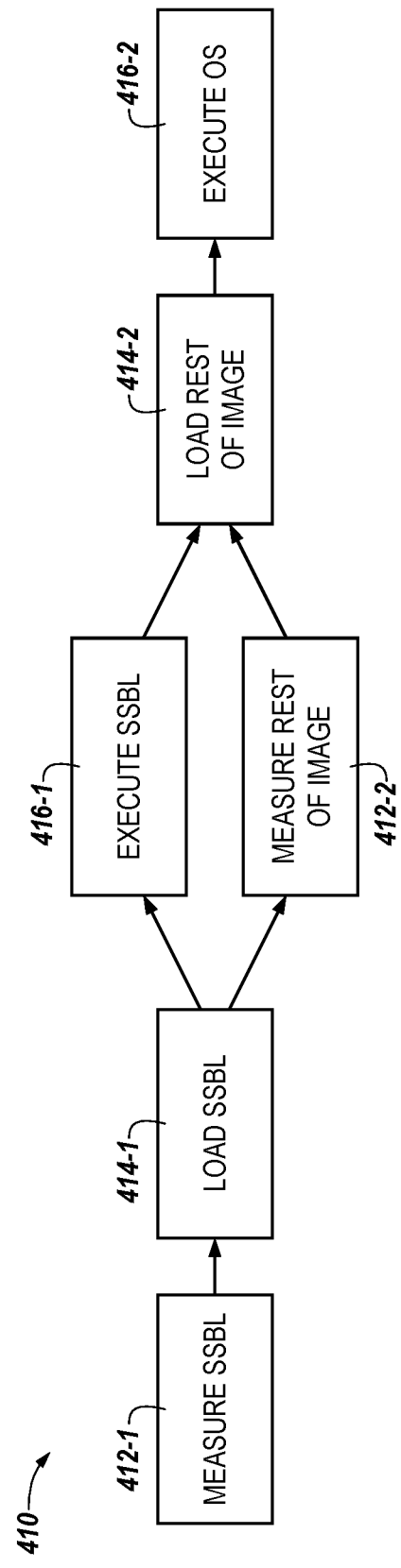
FIG. 4 illustrates a flow chart associated with a method for concurrently measuring and executing an image according with a number of embodiments of the present disclosure.

FIG. 4 illustrates a flow chart 410 associated with a method for concurrently measuring and executing an image according with a number of embodiments of the present disclosure. In the example provided by the flow chart 410, the image is an image of an OS. The image can include a second stage boot loader (SSBL). In some examples, the image can include a first stage boot loader (FSBL) and/or a SSBL. FIG. 4 can include a flow chart 410 used during a boot sequence.

A first stage boot loader (FSBL) can be included in the master boot record. The FSBL can be retrieved from secure memory such that in some instances the FSBL is not measured. The FSBL can comprise information used by the second processing resource to measure, load, and execute a SSBL. For example, the FSBL can include an address of the image. As another example, the FSBL can include an address of the SSBL. The SSBL can load an OS and transfer execution to the OS.

At 412-1 the SSBL can be measured. The second processing resource can access an address or identifier of the SSBL from the FSBL. The second processing resource can provide the address of the SSBL to the first processing resource. The first processing resource can retrieve the SSBL from the memory device and can measure the SSBL. The first processing resource can provide the determination of the measurement to the second processing resource.

Based on the determinant of the measurement of the SSBL, the first processing resource can load the SSBL at 414-1. For example, if the SSBL is determined to be secure, then the second processing resource can load or move the SSBL. If the SSBL is loaded, then the SSBL is copied from volatile memory from non-volatile memory. If the SSBL is not moved (e.g., loaded), then a copy of the SSBL is provided to the second processing resource without storing the SSBL in volatile memory.

At 416-2 and 412-2, the SSBL is executed and the rest of the image is measured concurrently. In the example provided in FIG. 4, the image can comprise two portions, the first portion can be a SSBL and the second portion can be the rest of the image. In other examples, the rest of the image can be further divided into additional portions.

At 414-2, the rest of the image can be loaded to volatile memory from non-volatile memory. At 416-2, the rest of the image can be executed. The rest of the image can be an OS. As such, the OS can be measured at 414-2 and loaded at 416-2.

Figure 5:
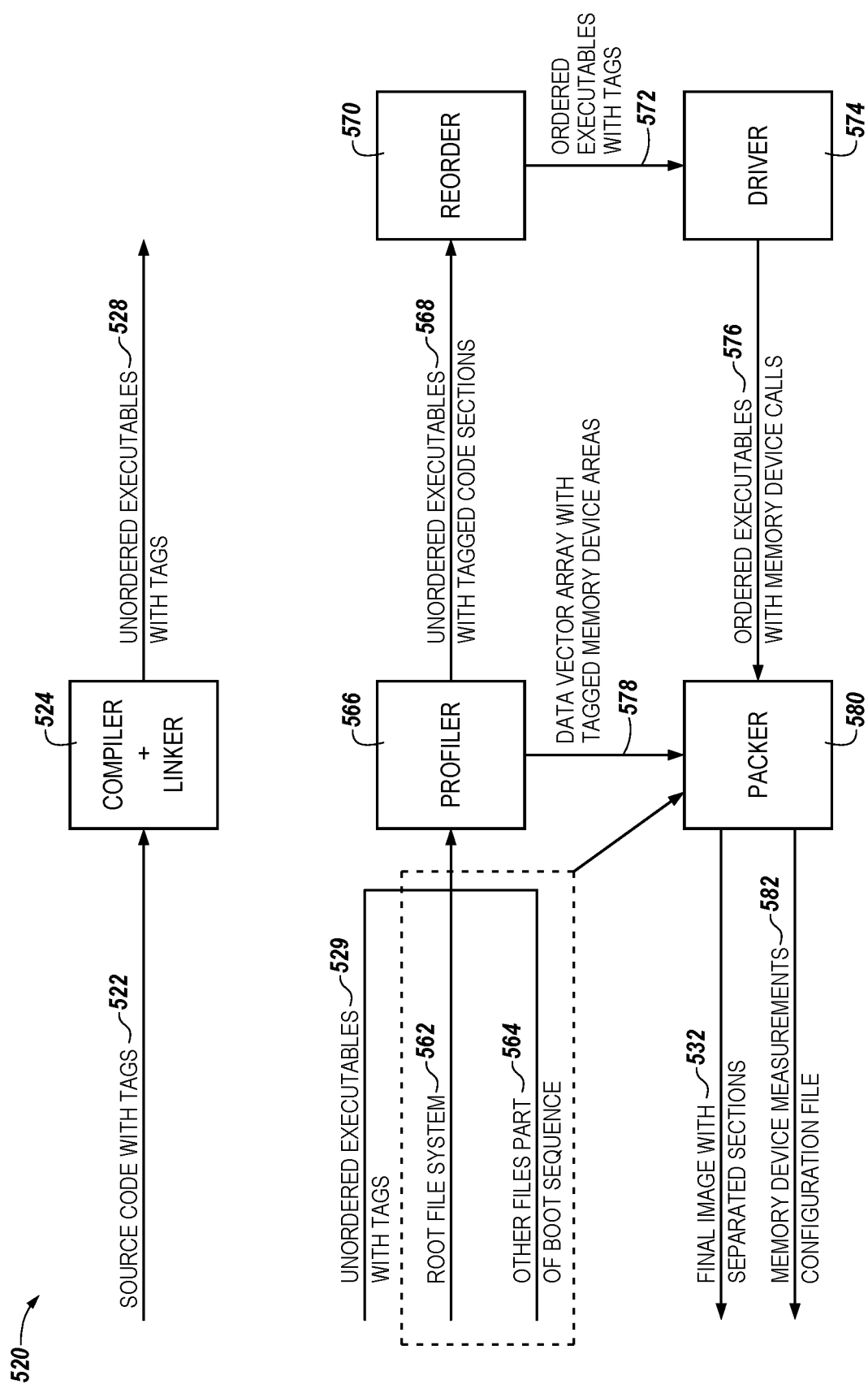
FIG. 5 illustrates a flow chart associated with generating an image according with a number of embodiments of the present disclosure.

FIG. 5 illustrates a flow chart 520 associated with generating an image according with a number of embodiments of the present disclosure. The flow chart 520 includes a compiler 524, a profiler 566, a reorder unit 570, a driver 574, and a packer 580. The packer 580 can be a secure packing tool. The compiler 524 can include a compiler and a linker. Each of the compiler 524, the profiler 566, the reorder unit 570, the driver 574, and the packer 580 can be implemented in hardware and/or software.

The compiler 524 can receive source code 522 corresponding to the image. The source code can include a plurality of tags. The tags can be added to a source code during development. The tags can identify different section of the source code 522. The different sections of the source code 522 can contain code that is able to be measure and executed without the need for code outside of a particular section.

The compiler 524 can include software or hardware to transform machine readable instructions written in a first programming language into machine readable instructions written in a second programming language. For example, the compiler 524 can receive the source code 522 that comprises machine readable instructions written in a first programming language and can generate the executable instructions which can comprise machine readable instructions in a second programming language.

The compiler 524 can generate the executable instructions 528. The executable instructions 528 are unordered and comprise tags. For example, the executable instructions 528 can include the tags provided with the source code 522 and the different section generated with the tags may be unordered. The order of the tags can correspond to the execution stream of the different sections of the executable instructions 528. For example, a second section may proceed a third section in the executable instructions 528 but may be executed after the execution of the third section. As such, the occurrence of the second section before the third section, given that the second section may be executed after the third section, can render the executable instructions 528 as unordered.

The profiler 566 can receive the executable instructions 529, a root file system 562, and boot sequence files 564. The file system 562 can describe the file system in which the image 532 is executed. The boot sequence files 564 can describe the boot sequence and can provide additional information used to execute the final image 532 in view of the boot sequence.

The profiler 566 can be an emulated profiler. The emulated profile can be a profiler implemented in machine executable instructions. The profiler 566 can also be hardware.

The profiler 566 can label code section based on the tags implemented in the executable instructions 529. For example, the beginning of the executable instructions 529 to the first tag can be labeled a first section, from the first tag to the second tag can be labeled a second section, etc. There can be one more section than there are tags. The profiler 566 can generate the executable instructions 568 comprising tags and sections, where the executable instructions 568 are unordered.

The profiler 566 can also identify the non-volatile memory load commands called between each tag from the executable instructions 529. In some examples, the compiler 524 can generate a single set of executable instructions 528 and the profiler 566 can receive multiple sets of executable instructions 529. The profiler 566 can label the areas of the non-volatile memory targeted by each load command with a section number. The profiler 566 can store the labels of the non-volatile memory and can provide the labels in a data vector 578.

The reorder unit 570 can reorder the executable instructions 568 using the tags and the code sections. The reorder unit 570 can generate the ordered executable instructions 572 comprising tags. The order of the executable instructions 572 can correspond to an execution stream of the executable instructions 568. For example, if a third section is executed before a second section, then the reorder unit 570 can reorder the third section and the second section such the third section occurs and/or is executed before the second section.

The order of the third section and the second section can determine the order in which the third section and the second section are measured, loaded, and/or executed. For example, reordering the third section before the second section provides for the measurement, loading, and/or execution of the third section before the second section. The third section can be measured and/or loaded before the second section is measured. The reordering provides for the concurrent execution and measurement of the third section and the second section, respectively.

The reorder unit 570 can reorder the executable instructions 568 and can modify the executable instructions 568 to correspond with the reordering. For example, the reorder unit 570 can update jump commands and/or linker information, among other portion of the executable instructions, that can be associated with each code section. Updating the jump command and/or linker information can provide for the jump commands and/or the linker information reflecting the updated ordering of the code sections. For example, the reorder unit 570 can update pointer information based on the reordering of the code sections.

The driver 574 can receive the executable instructions 572 and can generate the executable instructions 576. The executable instructions 576 can be ordered and can include memory calls (e.g., memory device calls). The driver 574 can be specific to the platform that is targeted by the executable. The platform describes the host, the processing resources, the memory device and/or other components of the computing device executing the image 532. The driver 574 can include low level commands used to communicate with the memory device. The driver 574 can inject the commands directly in the executable instructions 572 to generate the executable instructions 576. The commands can be placed where tags exist in the executable instructions 572. The driver 574 can replace the tag with a set of commands (e.g., calls) to the memory device. In some examples, the driver 574 can insert measure commands and load command in the executable instructions 572 to replace the tags in the executable instructions 572, where the tags identify measure commands and loads commands of sections (e.g., portions) of an image.

The packer 580 can receive the root file system 562, the boot sequence files 564, and the executable instructions 576. In some examples, the packer 580 can also receive the data vector 578 with tagged memory device areas. The packer 580 can generate an image 532 comprising separate code sections (e.g., portions). The packer 580 can also generate a configuration file 582. The configuration file 582 can be used by a memory device to measure synchronously with a processing resource external to the memory device. The measure commands implemented by a memory device utilize a configuration implemented by the memory device. For example, the memory device can be configured to perform measurements utilizing the configuration file 582.

Figure 6:
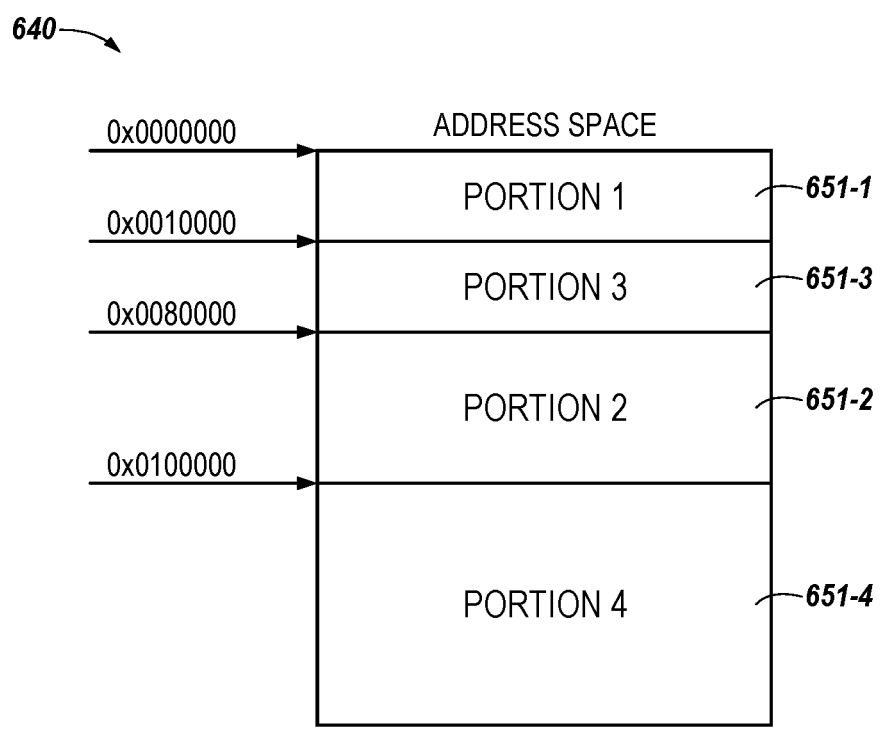
FIG. 6 is a block diagram of an address space comprising timing constrains in accordance with a number of embodiments of the present disclosure.

FIG. 6 is a block diagram of an address space 640 comprising timing constraints in accordance with a number of embodiments of the present disclosure. The address space 640 can store a plurality of portions 651-1, 651-2, 651-3, and 651-4 of an image, referred to as portions 651.

The portion 651-1 can be stored in a range of addresses beginning with address 0x0000000. The portion 651-2 can be stored in a range of addresses beginning with address 0x0080000. The portion 651-3 can be stored in a range of addresses beginning with address 0x0010000. The portion 651-4 can be stored in a range of addresses beginning with address 0x0100000.

The reorder unit 570 of FIG. 5 can order an execution of the portions 651 such that the portion 651-1 is executed before the portion 651-2 is executed, the portion 651-2 is executed before the portion 651-3 is executed, and the portion 651-3 is executed before the portion 651-4 is executed. In some examples, the reorder unit 570 can order the concurrent execution and measurement of the portions 651 such that the portion 651-1 is executed concurrently with the measurement of the portion 651-2, the portion 651-2 is executed concurrently with the measurement of the portion 651-3, and the portion 651-3 is executed concurrently with the measurement of the portion 651-4.

The reorder unit 570 can order the concurrent execution and measurement of the portions 651 using the addresses corresponding to each of the portions 651. For example, the reorder unit 570 can associate the portion 651-1 with the address 0x0080000 to indicate that the portion 651-1 is to be executed concurrently with the measurement of the portion 651-2. The processing resource executing the portion 651-1 can provide the address 0x0080000 to the cryptoprocessor and continue with the execution of the portion 651-1. The cryptoprocessor can retrieve the portion 651-2 using the address 0x0080000 and can measure the portion 651-2 concurrently with the execution of the portion 651-1 as previously defined.

If the cryptoprocessor, responsive to measuring the portion 651-2, determines that the portion 651-2 is not secure, then the cryptoprocessor can indicate such to the processing resource. The processing resource can prevent unsecure memory access by refraining from loading or executing the portion 651-2 based on the results of the measurement.

In some embodiments, the processing resource can poll the cryptoprocessor regarding the measurement of a portion of the image. The processing resource can poll the cryptoprocessor instead of waiting for the cryptoprocessor to respond with a result of the measurement. The processing resource can poll the memory device and/or the cryptoprocessor by accessing a register of the memory device to determine whether the portions 651 of the image have been measured and/or to retrieve a result of the measurement.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one.

Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory device;
a first processing resource executing instructions stored in the memory device to:
measure a second stage boot loader (SSBL) of an image responsive to execution of a first stage boot loader (FSBL) by a second processing resource;
execute the SSBL responsive to measuring the SSBL; and
the second processing resource executing instructions stored in the memory device to:
measure a remainder of the image, concurrently with an execution of the SSBL by the first processing resource, to determine whether the remainder of the image has been produced by a trusted agent, wherein the second processing resource executes the FSBL and measures the remainder of the image; and
execute the remainder of the image.

2. The apparatus of claim 1, wherein the FSBL is included in a master boot record.

3. The apparatus of claim 1, wherein the second processing resource is further configured to measure the FSBL prior to the first processing resource measuring the SSBL.

4. The apparatus of claim 1, wherein the second processing resource is further configured to execute the FSBL prior to the first processing resource executing the SSBL.

5. The apparatus of claim 1, wherein the second processing resource is configured to execute the FSBL to obtain information used by the first processing resource to measure and execute the SSBL.

6. The apparatus of claim 5, wherein the second processing resource is configured to execute the FSBL to obtain an address of the image.

7. The apparatus of claim 5, wherein the second processing resource is configured to execute the FSBL to obtain an address of the SSBL.

8. The apparatus of claim 1, wherein the second processing resource is further configured to load an operating system (OS) responsive to executing the SSBL.

9. The apparatus of claim 8, wherein the second processing resource is further configured to transfer execution to the OS.

10. A method, comprising:
measuring, using a first processing resource coupled to a memory device, a second stage boot loader (SSBL) of an image responsive to execution of a first stage boot loader (FSBL) by a second processing resource, wherein the SSBL is measured to determine whether the SSBL is secure;

executing, using the first processing resource, the SSBL responsive to a determination that the SSBL is secure;

measuring, using a second processing resource coupled to the memory device, a remainder of the image, concurrently with an execution of the SSBL by the first processing resource, to determine whether the remainder of the image has been produced by a trusted agent, wherein the second processing resource executes the FSBL and measures the remainder of the image; and executing, using the second processing resource, the remainder of the image.

11. The method of claim 10, further comprising retrieving the FSBL from secure memory.

12. The method of claim 10, further comprising retrieving the FSBL from secure memory without measuring the FSBL.

13. The method of claim 10, further comprising accessing, using the first processing resource, an address of the SSBL from the FSBL.

14. The method of claim 10, further comprising providing, by the second processing resource, an address of the SSBL retrieved from the FSBL to the first processing resource.

15. The method of claim 10, further comprising providing the determination that the SSBL is secure from the first processing resource to the second processing resource.

16. The method of claim 15, further comprising measuring, using the second processing resource, the remainder of the image responsive to the determination that the SSBL is secure.

17. An apparatus, comprising:
a memory device;
a first processing resource executing instructions stored in the memory device to:
  measure a second stage boot loader (SSBL) of an image of an operating system (OS) responsive to an execution of a first stage boot loader (FSBL) by a second processing resource;
  execute the SSBL responsive to measuring the SSBL; and
the second processing resource executing instructions stored in the memory device to:
  measure a remainder of the image, concurrently with an execution of the SSBL by the first processing resource, to determine whether the remainder of the image has been produced by a trusted agent, wherein the second processing resource executes the FSBL and measures the remainder of the image; and
  execute the remainder of the image responsive to a determination that the remainder of the image has been produced by the trusted agent.

18. The apparatus of claim 17, wherein second processing resource is further configured to measure the FSBL to determine whether the FSBL is secure.

19. The apparatus of claim 17, wherein the second processing resource is further configured to execute the FSBL prior to the first processing resource measuring the SSBL.

20. The apparatus of claim 17, wherein the second processing resource is further configured to execute the FSBL prior to the second processing resource measuring the remainder the image.

* * * * *